Patented June 24, 1930

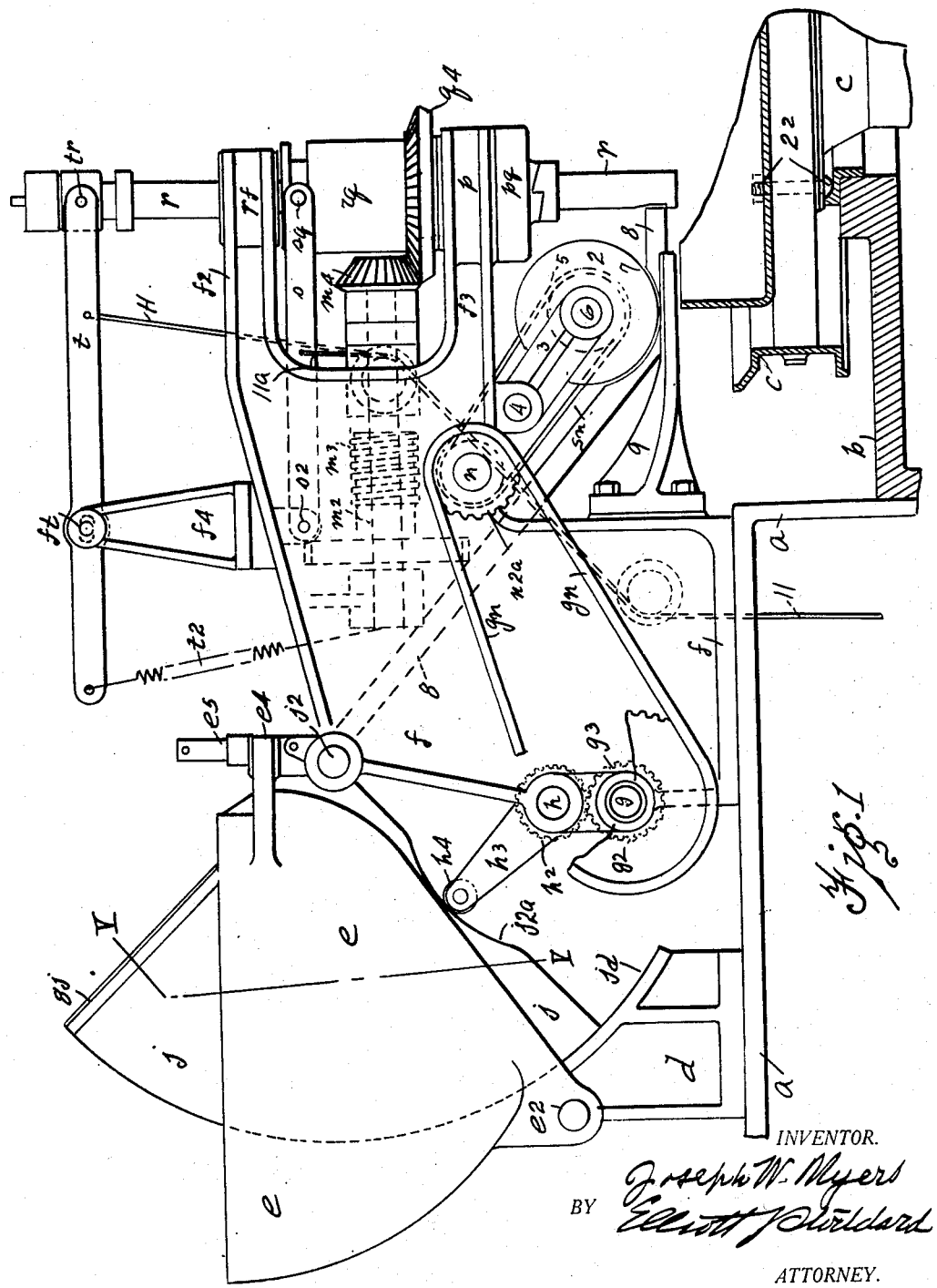

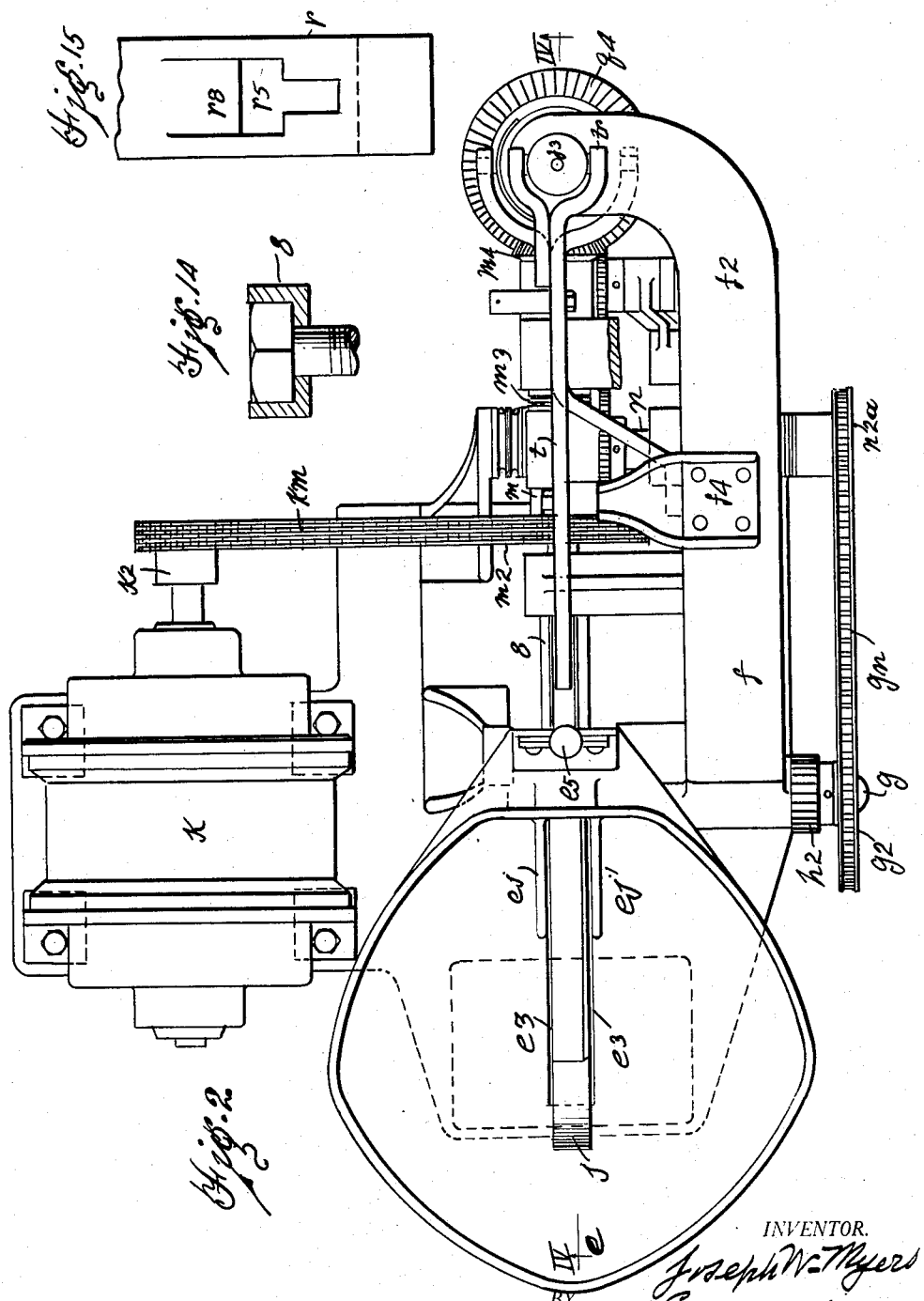

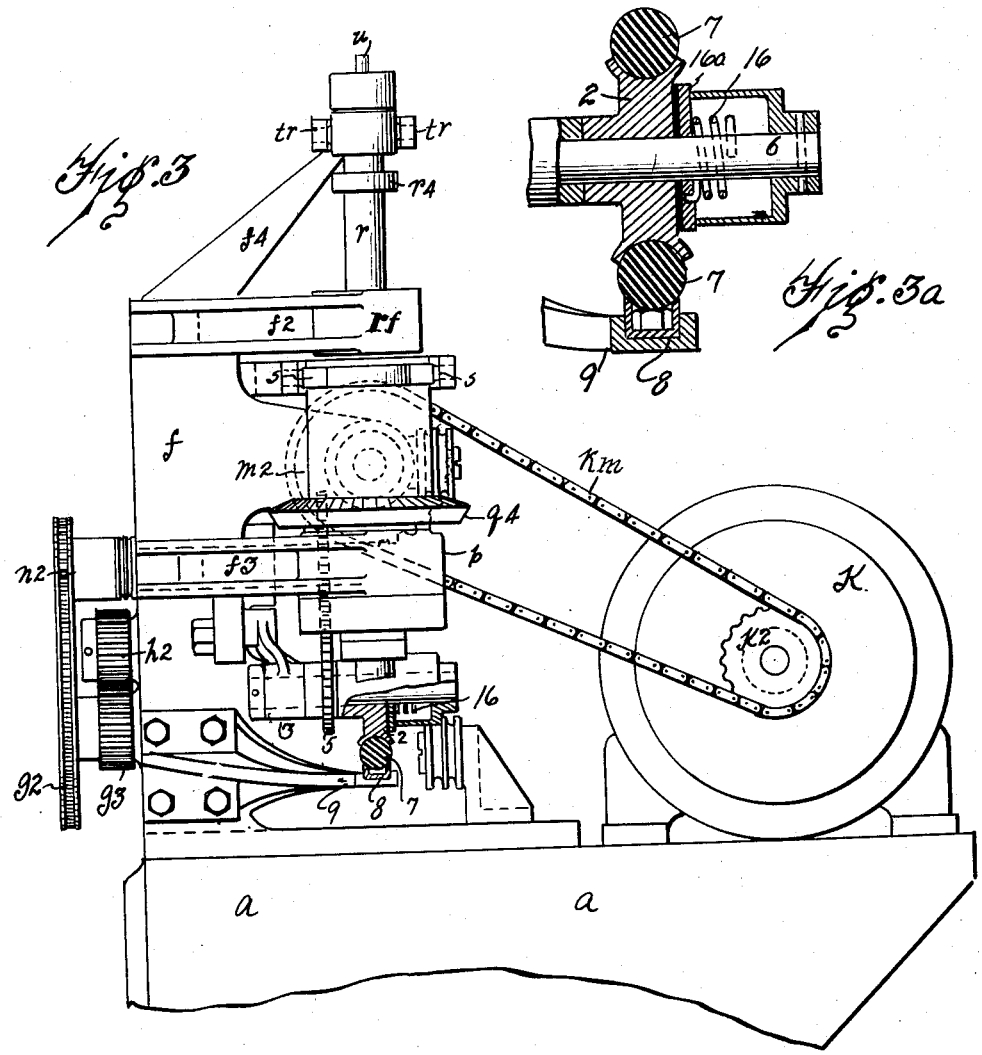
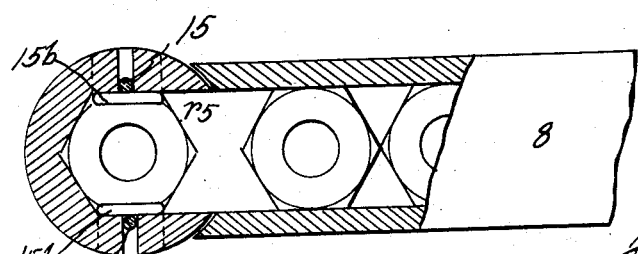

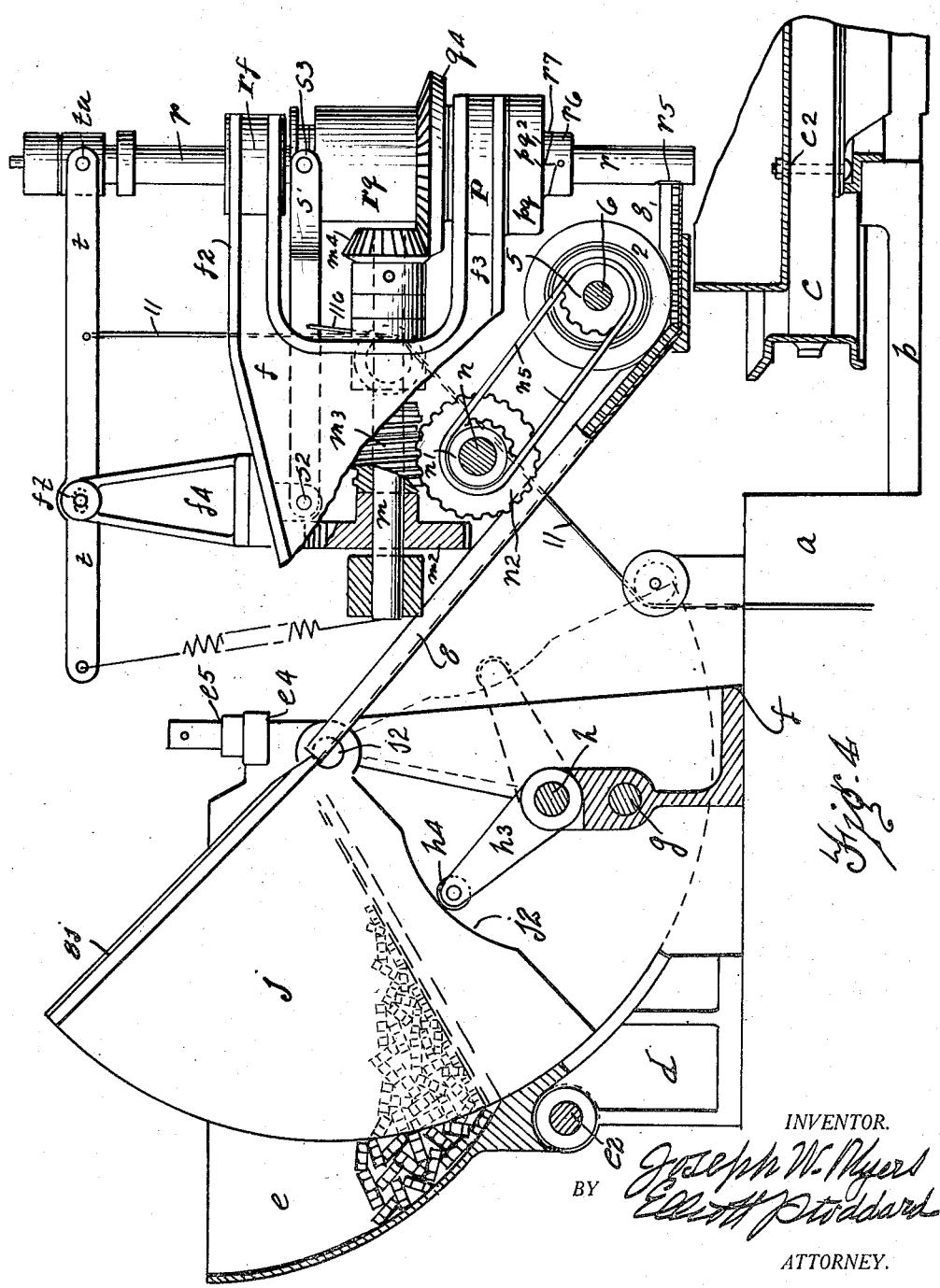

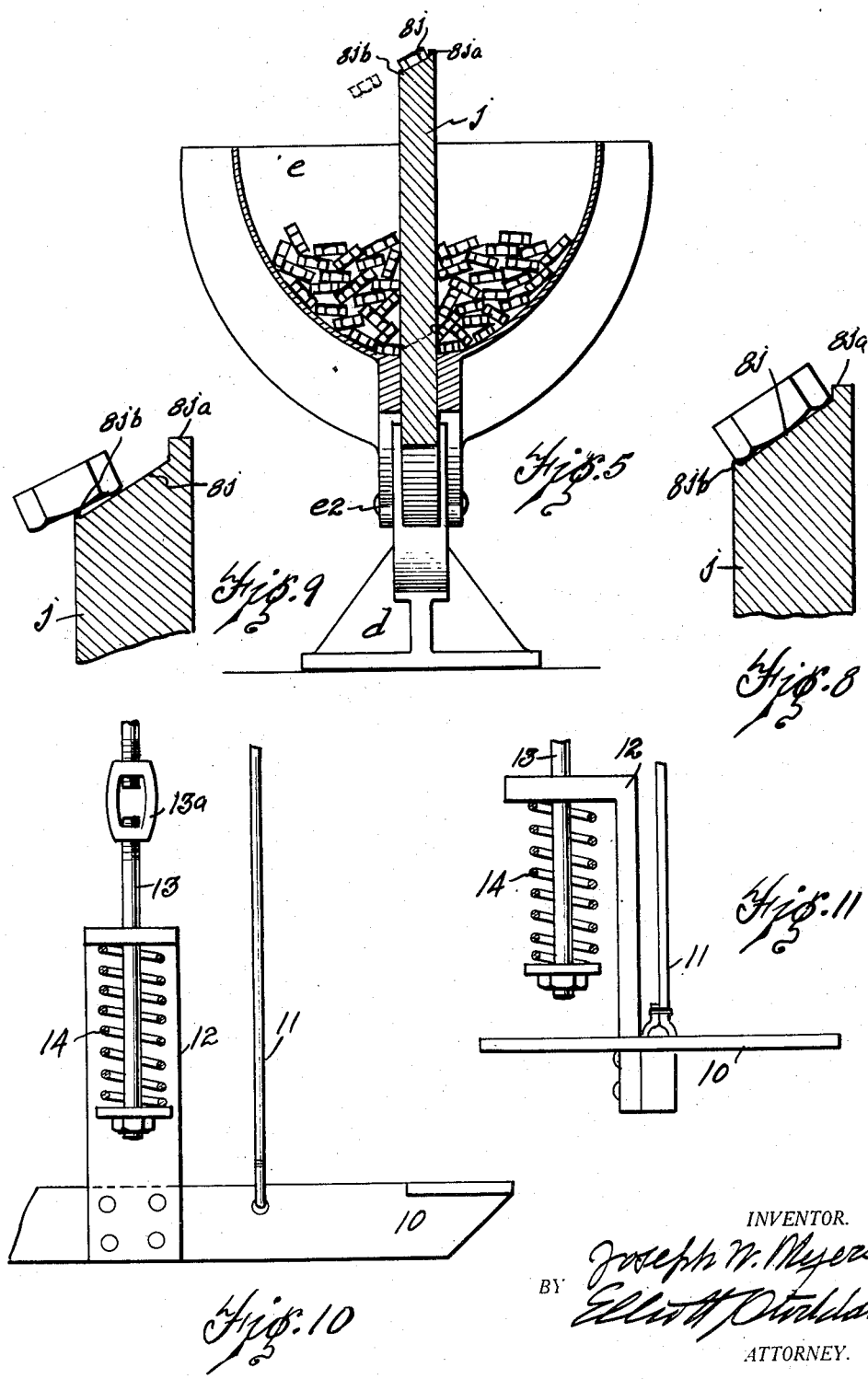

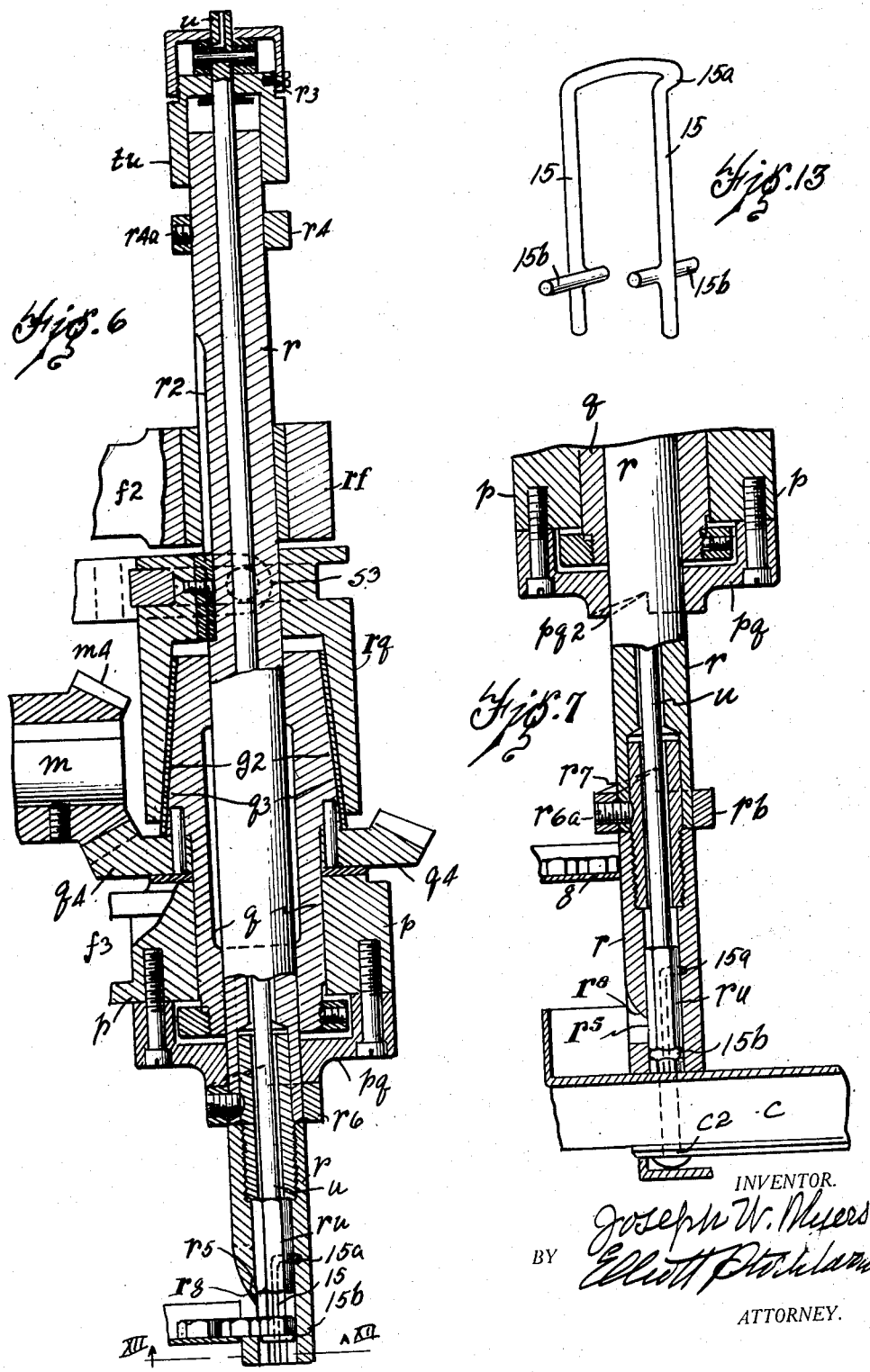

1,766,139

UNITED STATES PATENT OFFICE

JOSEPH W. MYERS, OF JACKSON, MICHIGAN

NUT-SETTING MACHINE

Application filed October 20, 1926. Serial No. 142,889.

My invention relates to a nut setting machine and an object of my improvements is to provide an automatic machine which shall take nuts from a hopper, place them upon their respective spindles and set them up to place with the required force.

I secure this object in the machine shown in the accompanying drawings in which:—

Figure 1 is a side elevation, partly broken away, of a machine embodying my invention.

Figure 2 is a plan view of the same.

Figure 3 is an elevation looking from the right of Figure 1.

Figure $3^a$ is a detail sectional view illustrating the nut actuating wheel with its shaft and the operation of said wheel.

Figure 4 is a sectional elevation to an enlarged scale approximately in the plane IV, IV Figure 2.

Figure 5 is a section on the line V, V, Figure 1.

Figure 6 is a sectional elevation to an enlarged scale of the spindle and adjacent parts.

Figure 7 is a detail section of the lower portion of the spindle of Figure 6 showing the parts in a different position.

Figure 8 is a sectional elevation to an enlarged scale of the upper edge of the plate for picking up the nuts, showing the nut in an inverted position.

Figure 9 is a similar view to Figure 8 showing how the misplaced nut is automatically displaced.

Figure 10 is a detail showing the lever operating pedal and adjacent parts in side elevation.

Figure 11 is a detail view looking from the right at Figure 10.

Figure 12 is an inverted plan view, partly broken away, showing the delivery trough, the lower end of the spindle and the nut retaining cage therein.

Figure 13 is a perspective view of the spring retaining cage at the lower end of the spindle.

Figure 14 is a detail section showing a modified form of feed trough, or track.

Figure 15 is a detail elevation showing a modified construction.

$a$ is the bench, or support for the operating mechanism. $b$ is a vertically adjustable shelf at the front of the bench $a$ upon which the article is placed to which the nuts are to be adjusted, in this case an automobile wheel $c$ having bolts as $c^2$ therein which are to have nuts fixed upon their upper screw threaded ends. $d$ is a standard secured upon the upper surface of the bench $a$ and extending upwardly therefrom. $e$ is a hopper pivoted at $e^2$ to the standard $d$ and secured in operative position to the frame of the machine by a suitable fastening $e^4$, $e^5$.

The nuts to be used are placed in bulk in the hopper $e$ and are automatically taken from said hopper and fed into correct position to the setting apparatus as hereinafter described. If a quantity of nuts is left in the hopper when a job is finished the fastening $e^4$, $e^5$ is loosened and the hopper $e$ turned about the pivot $e^2$ to dump the nuts into a convenient receptacle.

The hopper $e$ is slotted in a diametrical direction from its right hand end to a point somewhat beyond its center, as indicated at $e^3$, $e^3$ Figure 2.

$j$ is a triangular plate pivoted at one corner to the frame of the machine at $j^2$. The further edge of said plate is formed in the arc of a circle with its center at the axis of the pivot $j^2$. This plate is so placed that it shall oscillate about said pivot in the slot $e^3$ $e^3$ of the hopper $e$ so that its upper edge shall come below the nuts and about to the bottom of the hopper $e$ at the lower limit of its travel and to the position shown in Figure 1 at the upper limit of its travel, at which latter position it is so inclined that nuts which have fallen into the groove $8^j$ at its upper edge shall slide along said groove and if in proper position to be used by the machine will be delivered to the feed trough 8. The bottom of the groove $8^j$ is inclined laterally and has a flange $8^{ja}$ along its upper edge and a flange $8^{jb}$ along its lower edge. The latter flange is of less height than the rise due to the chamfer or finishing at the upper surface of the nut, so that if the nut falls into the groove $8^j$ in inverted position when the plate $j$ is raised to its upper position, as shown in Figure 1, the nut will fall over said flange and back into the hopper while the nuts that are right side up will be held in the trough thereby.

$ej$ are baffle plates adapted to keep nuts from falling into the forward part of the upper surface or grooved upper edge of the plate $j$ (Figure 2), and $jd$ is an arcuate guide surface on the standard $d$ along which the arcuate edge of the plate $j$ travels. $J^{2a}$ is a portion cut out of the lower edge of the plate $j$ to form a surface suitable for the actuating roller to operate upon.

$g$ is a horizontal shaft extending transversely of the frame $f$ of the machine and resting in bearings on said frame. $g^2$ is a sprocket-wheel keyed upon the shaft $g$. $g^3$ is a gear wheel on the shaft $g$. $h$ is a shaft parallel to the shaft $g$ resting in a bearing on the frame $f$ and provided with a gear wheel $h^2$, the teeth of which mesh with the teeth of the gear wheel $g^3$. $h^3$ is an arm keyed to the shaft $h$, extending radially therefrom and provided with a friction roller $h^4$ at its outer end. The plate $j$ rests because of its weight against the roller $h^4$ and as the shaft $h$ rotates said roller acts against the lower edge of said plate to oscillate said plate upward around the pivot $j^2$, the surface $j^{2a}$ acting to permit the plate $j$ to remain at rest for a moment at the upper limit of its travel.

$k$ (Figure 2) represents an electric motor which may be used to operate the machine. This has a sprocket-wheel $k^2$ upon its shaft and conveys power through a sprocket-chain $k^m$ and a sprocket-wheel $m^2$ to a shaft $m$. $m^3$ is a thread upon the shaft $m$ engaging the teeth of a worm wheel $n^2$ upon a horizontal shaft $n$ resting horizontally in bearings on the frame $f$ and extending parallel to the shafts $g$ and $h$. $n^{2a}$ is a sprocket-wheel on the shaft $n$ and $gn$ is a sprocket-chain passing over the sprocket-wheels $n^{2a}$ and $g^2$.

8 is a feed trough which receives nuts from the groove $8^j$ in the upper edge of the plate $j$ and delivers them to the feeding device of the machine.

3 is an arm pivoted at one end to a stationary pivot 4 upon the frame of the machine extending approximately parallel and above the trough 8. 6 is a short shaft adapted to turn in a bearing at the lower free end of the arm 3 and driven by a sprocket-chain and wheels from the shaft $n$. 2 is a wheel with a grooved periphery adapted to turn more or less upon the shaft 6.

The shaft 6 is connected by the yielding spring 16 (Figure 3$^a$) to a friction clutch 16$^a$ which is thus interposed between the shaft and said wheel so that the wheel shall not turn at all times and wear out its rubber tire.

7 is a rubber tire on the grooved wheel 2. The tire 7 rests upon the nuts delivered under it by the trough 8 and forces said nuts toward the setting spindle.

$f^2$, $f^3$, are two horizontal projections from the frame $f$ respectively, having bearings $rf$, and $p$ in their outer ends.

$q$ is a vertical sleeve bearing and adapted to rotate in the stationary bearing $p$. The upper end of the sleeve $q$ is formed to present a conical friction surface $q^2$ which may be covered with a suitable friction material $q^3$. $q^4$ is a conical gear wheel fixed to the lower end of the sleeve $q$. $m^4$ is a conical gear wheel on the outer end of the shaft $m$, the teeth of which engage the teeth of the gear wheel $q^4$.

$r$ is a hollow spindle fitting and adapted to reciprocate longitudinally through the bore of the sleeve $q$ and also fitting and adapted to reciprocate and rotate in the bearing $rf$ at the end of the projection $f^2$. $rq$ is a conical clutch keyed upon the spindle $r$ but adapted to reciprocate longitudinally on said spindle to engage or free the conical surface $q^2$ on the sleeve $q$. $s$ is a lever arm pivoted at $s^2$ to the frame $f$ and engaging the clutch $rq$ by a groove and fork connection $s^3$. 11$^a$ is a cable connected to the lever $s$ and to the cable 11 leading downward around suitable pulleys to a pedal 10 at the lower portion of the machine.

$u$ is a plunger fitting and adapted to reciprocate longitudinally in the bore of the spindle $r$. The lower end of said bore is made hexagonal so as to receive a nut and hold it in position as hereinafter described. The lower end of the plunger $u$ is formed at $ru$ to fit and reciprocate in the hexagonal portion of the bore of the spindle $r$. $tu$ is a cylindrical cap secured at the top of the plunger $u$ so as to permit said plunger to rotate therein but constrained from relative motion longitudinally of said plunger. $t$ is a lever arm pivoted at $ft$ to the upper end of a standard $f^4$ rising from the frame $f$. The lever arm $t$ is connected at its outer end to the cap $tu$ so as to reciprocate said cap vertically. $t^2$ is a spring acting upon the lever arm $t$ to hold said cap at the upper limit of its travel. 11 is a cable secured at its upper end to the lever arm $t$ extending downward around suitable pulleys to a pedal 10 at its lower end.

$r^4$ is an annulus upon the spindle $r$ secured in position by a set screw $r^{4a}$. $r^2$ is a longitudinal groove in the surface of the spindle $r$.

The cone-clutch $rq$ is provided with a key which engages in the groove $r^2$ so as to permit relative motion of said spindle and clutch and prevent relative angular movement. $r^6$ is an annulus secured by a set screw $r^{6a}$ to the spindle $r$ and provided with a tooth $r^7$ at its upper edge adapted to engage a tooth $pq^2$ at the lower surface of the cap $pq$, said teeth acting as engaging lugs to fix a relative angular position of the spindle $r$.

$r^5$ is an aperture formed through the walls of the spindle $r$ towards its lower end. The lower wall of said aperture is in line with the bottom of the trough 8 at the delivery end of said trough when the spindle $r$ is at the upper end of its travel and is fixed in this position by the teeth $r^7$ and $pq^2$. The upper wall of the aperture $r^5$ is chamfered to a sharp edge at $r^8$.

15, 15 (Figure 13) are two branches of a spring frame united at their upper ends by a laterally extending loop $15^a$ and provided at their lower ends with cross bars $15^b$, $15^b$. This frame is fitted into suitable grooves formed in the bore of the spindle $r$ at its lower end so that the bars $15^b$ shall act as yielding supports to the nuts in the bore of said spindle.

The pedal 10 has the cable 11 attached thereto and is provided with an overhanging attachment 12. 13 is a rod extending downward from a portion of the frame $f$ and provided with an adjusting turn buckle $13^a$. 14 is a spring between the treadle and the rod 13.

The operation of the above described machine is as follows:

A quantity of suitable nuts are placed in the hopper $e$ and motion is communicated to the parts from the motor $k$. When the upper edge of the plate $j$ comes below the nuts in the hopper the nuts must fall into the groove $8^j$, some in correct position to be fed along said groove, some in inverted position, and some with corners extending over the flange $8^{jb}$. When the plate $j$ is forced to its upper position by the lever arm $h^3$ the nuts that are correctly located are fed along said groove and delivered to the upper end of the feed trough 8. All other nuts fall back into the hopper $e$.

The nuts in the trough 8 are fed along the same by gravity and under the rubber rim or tire 7 of the wheel 2 and are thereby forced by the friction of the rim toward and into the spindle $r$ through the apertures $r^5$.

The lever $t$ is now drawn downward by the cable 11 and pedal 10, carrying the plunger $u$ with it until the lower end of cap $tu$ strikes against the annulus $r^4$. At this time the lower end of the plunger $u$ has forced the nut in the bore of the spindle $r$ down to the lower end of said spindle, where it is yieldingly supported by the rods $15^b$, $15^b$. A further movement of the pedal 10 forces the spindle $r$ down until the nut at its lower end engages over the upper end of the bolt $c^2$ (Fig. 7).

When the spindle $r$ has been carried down till the tooth $r^7$ is freed from the tooth $pq^2$ the further movement of the pedal 10 draws downward on the lever $s$ which causes the clutch $rq$ to engage more positively with the conical portion $q^2$ of the sleeve $q$. As said sleeve is being rotated by the gear wheel $m^4$ $q^4$ the spindle $r$ is set in motion turning the nut and screwing it up on its bolt $c^2$ and setting it to place with the required force.

When the pedal 10 is released the friction in the clutch greatly lessens taking the torque off the wrench head so that the latter may slip off the nut, the spring $t^2$ lifts the lever $t$ carrying the plunger $u$ up until a shoulder upon it engages a shoulder on the spindle $r$ and then carrying said spindle up until the annulus $r^6$ engages the stationary part $pq$ and the tooth $r^7$ the tooth $pq^2$. At this position the aperture $r^5$ is opposite the delivery end of the trough 8 and the spring 16 acts upon the wheel 2 to snap another nut into position in the bore of the spindle $r$.

When the spindle $r$ is forced down the chamfered wall $r^8$ of the aperture, $r^5$ is inserted between the nut in the bore of the spindle and the following nut in the aperture $r^5$ and forces the following nut back out of the aperture $r^5$. The wheel 2 may yield to permit this because of the spring 16 and clutch $16^a$ connecting it with its shaft 6.

Should there be a defective nut that does not engage the bolt it will be yieldingly held in position and will be forced out of the lower end of the spindle at the next operation of the machine.

By adapting the trough, or track, 8 and aperture $r^5$ in the side of the spindle, as shown in Figures 14 and 15 respectively, the machine may be made to feed and set cap-screws and the like to position.

Where the word "nut" is used, therefore, it is to be understood as referring broadly to articles adapted to be handled in substantially the way described.

The lower part of the spindle $r$ is made detachable to form a wrench head in order that this part may be easily removed and replaced by a part adapted to the particular work required. The end of the plunger $u$ acts to straighten the nut in the bore of the spindle, or wrench head and is helped in this by the spring at the delivery end.

What I claim is:

1. In an apparatus of the kind described, a spindle, means for reciprocating and rotating said spindle, said spindle being provided with an aperture through its side wall, said spindle being adapted to receive and set a nut in place, means for feeding nuts consecutively to said spindle through said aperture, one wall of said aperture being chamfered to separate the nut being fed toward said spindle from the nuts in said spindle.

2. In an apparatus of the kind described, the combination of a spindle adapted to receive and adjust a nut to place, said spindle having an aperture through its side, means for feeding nuts through said aperture, a yielding driving means adapted to rotate said spindle and means for arresting the rotating motion of said spindle when said aperture is in position to receive a nut from said feeding means.

3. In an apparatus of the kind described, a nut setting spindle, means for reciprocating said spindle, a yielding means acting to rotate said spindle, said spindle being provided with an aperture through its side wall, means for feeding nuts to said spindle through said aperture, a stationary lug, a lug upon said spindle adapted to engage said stationary lug when said spindle is at one end of its reciprocating stroke and said aperture is in position to receive a nut from said feeding means.

4. In an apparatus of the kind described, the combination of a spindle, means for rotating said spindle and means for reciprocating said spindle longitudinally thereof, an aperture through the side of said spindle, means for feeding nuts to and through said aperture, a plunger adapted to reciprocate longitudinally in said spindle and to act upon each nut that has passed through said aperture to force it to the delivery end of the said spindle.

5. In an apparatus of the kind described, the combination of a spindle, means for rotating said spindle and means for reciprocating the same longitudinally thereof, a plunger in said spindle adapted to reciprocate therein, said spindle being provided with an aperture through its side wall, means for feeding nuts through said aperture, said plunger being adapted to be retracted when said spindle is retracted and to be forced forward and to force a nut to the delivery end of said spindle before said spindle is forced forward to adjust the nut to place.

6. In an apparatus of the kind described, a spindle adapted to receive and set nuts to place, the end of said spindle having an aperture through its side wall adapted to receive a nut and being removable and having a bore shaped to the cross section of a nut and adapted to permit a nut to slide longitudinally therein whereby said end is adapted to form a wrench head.

7. The combination of the spindle $r$ having a bore through which nuts are delivered, said bore being provided with suitable slots in the walls at the delivery end of said bore of a spring frame having a loop $15^a$ and the limbs 15, 15 fitting in said slots and supporting lugs on said limbs.

8. In an apparatus of the kind described, the combination of the sleeve $q$, means for rotating said sleeve, a spindle $r$ coaxial with said sleeve and adapted to turn and reciprocate relative thereto, a clutch part $rq$ keyed upon said shaft so as to reciprocate relative thereto and adapted to be frictionally engaged with and disengaged from said sleeve, a plunger passing axially in said spindle and having a limited longitudinal movement relative thereto, and means for actuating said plunger longitudinally and the said spindle and then to engage said clutch part.

9. In an apparatus of the kind described, the combination of a nut setting apparatus, means for feeding nuts to said apparatus, consisting in part of a wheel engaging said nuts at its periphery to force them toward said setting apparatus, means for turning said wheel, and a spring and friction clutch interposed between said wheel and its turning means.

In testimony whereof, I sign this specification.

JOSEPH W. MYERS.